A. J. HALL AND C. C. WHITTAKER.
CONTROL APPARATUS.
APPLICATION FILED DEC. 9, 1916.

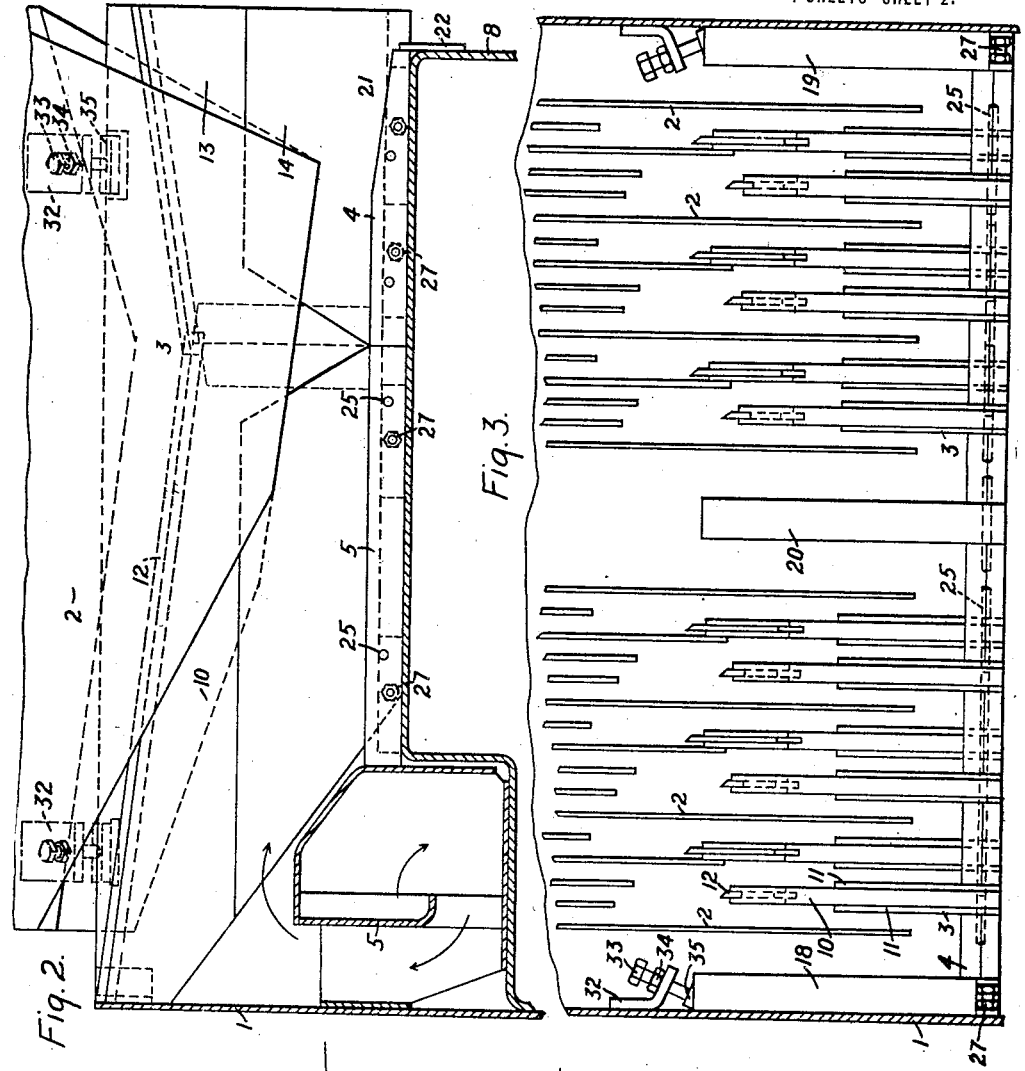
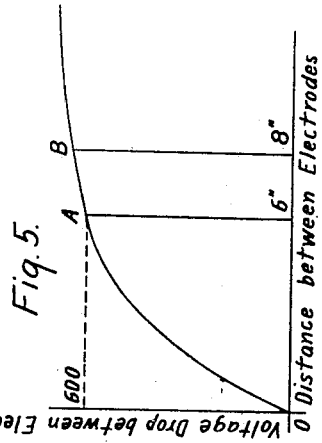
A. J. HALL AND C. C. WHITTAKER.
CONTROL APPARATUS.
APPLICATION FILED DEC. 9, 1916.
1,352,448. Patented Sept. 14, 1920.
4 SHEETS—SHEET 2.
WITNESSES:
Fred A. Lind
W. P. Coley
INVENTOR
Arthur J. Hall
& Charles C. Whittaker
BY
Wesley G. Carr
ATTORNEY

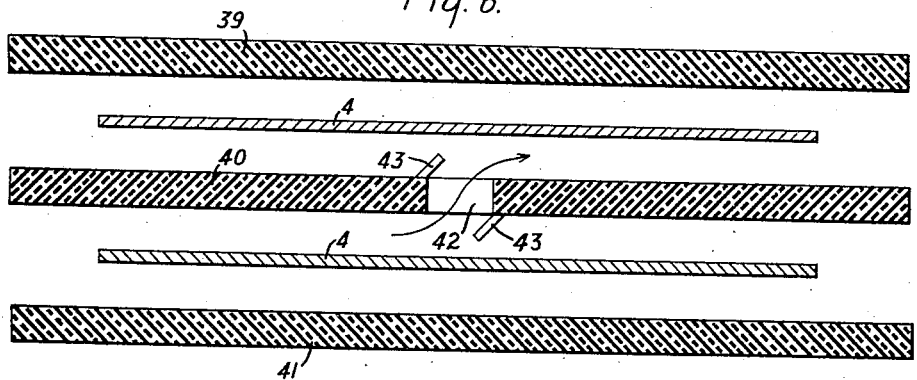
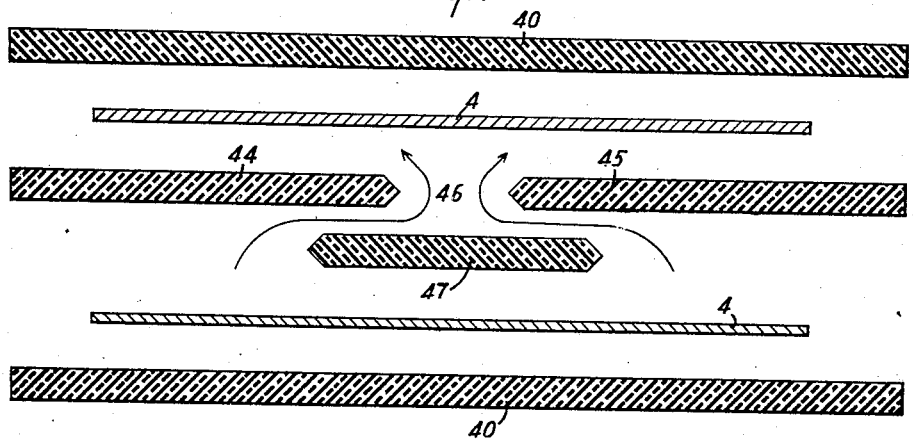

1,352,448.

Patented Sept. 14, 1920.
4 SHEETS—SHEET 4.

WITNESSES:
Fred. A. Lind
W. R. Coley

INVENTOR
Arthur J. Hall
& Charles C. Whittaker
BY
Wesley G. Carr
ATTORNEY

UNITED STATES PATENT OFFICE.

ARTHUR J. HALL AND CHARLES C. WHITTAKER, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL APPARATUS.

1,352,448.   Specification of Letters Patent.   Patented Sept. 14, 1920.

Application filed December 9, 1916. Serial No. 136,033.

*To all whom it may concern:*

Be it known that we, ARTHUR J. HALL, a subject of the King of Great Britain, and a resident of Wilkinsburg, in the county of Allegheny and State of Pennsylvania, and CHARLES C. WHITTAKER, a citizen of the United States, and a resident of Wilkinsburg, in the county of Allegheny and State of Pennsylvania, have invented a new and useful Improvement in Control Apparatus, of which the following is a specification.

Our invention relates to control apparatus and especially to certain structural features of liquid rheostats and the like.

The object of our invention is to provide means which is simple and inexpensive in construction and effective and reliable in operation for enabling a liquid rheostat to be employed in connection with relatively high-voltage circuits without any of the undesirable results that have obtained in the prior art when such high-voltage operation was attempted.

More specifically stated, it is the object of our invention to provide a plurality of specially arranged non-conducting barrier members extending upwardly from the tank bottom to a predetermined height between the electrodes, thereby causing the electric current-carrying particles of the liquid to follow tortuous paths and thus effect proper operation of the rheostat under relatively high-voltage conditions, as hereinafter more fully set forth.

Figure 1:
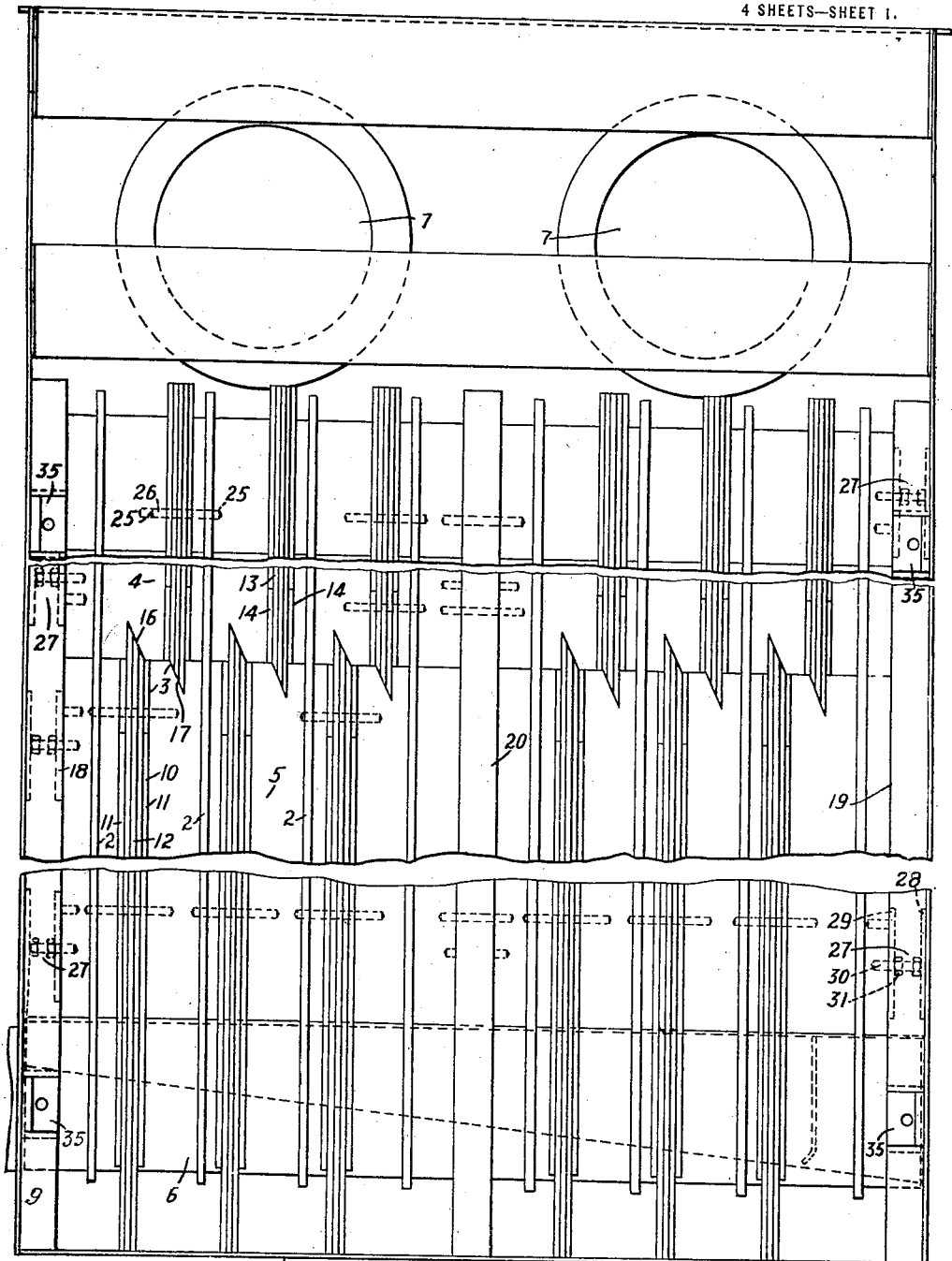
Figure 8:
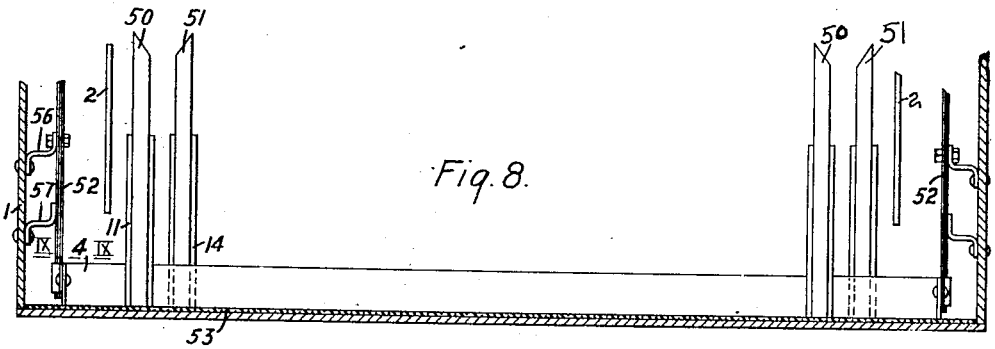
Figure 9:
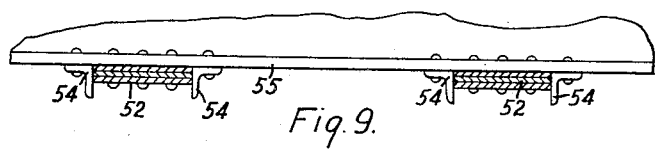
Figures 10, 11:
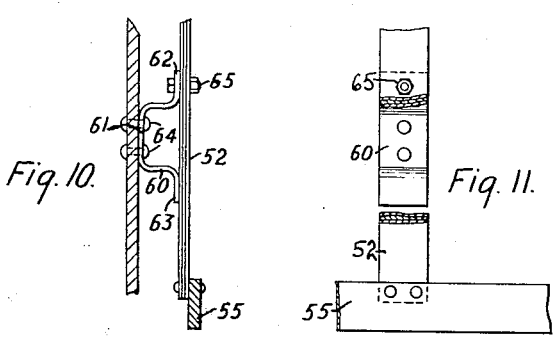

Our invention may best be understood by reference to the accompanying drawings, wherein Figure 1 is a plan view of a liquid rheostat constructed in accordance with our invention; Fig. 2 is a view, partially in side elevation and partially in section, of a portion of the apparatus shown in Fig. 1; Fig. 3 is a view, partially in end elevation and partially in section, of our liquid rheostat; Fig. 4 is a detail view of a portion of one of the barrier members of the preceding figures; Fig. 5 is a curve chart serving to illustrate the normal relation between the voltage drop and the distance, from one electrode to another, in a simple electrolytic cell; Fig. 6 and Fig. 7 are diagrammatic views of modifications of the non-conducting barrier arrangement shown in Fig. 1; Fig. 8 is a fragmentary view, in transverse section, of a further modification thereof; Fig. 9 is a fragmentary sectional view taken on the line IX—IX of Fig. 8; and Fig. 10 and Fig. 11 are views, in side elevation and in front elevation, respectively, of a further modified form of a portion of the barrier structure.

Referring to the drawings, the structure shown comprises a rectangular liquid-rheostat tank 1 containing a plurality of spaced electrodes or plates 2 and a plurality of non-conducting barrier members 3 that extend upwardly from the tank bottom to a predetermined height between certain successive electrodes 2; a plurality of base-blocks 4 and 5 for the purpose of suitably assembling the barrier members into a compact unitary structure; an inlet tube or weir 6 that extends across one end of the tank 1; and a plurality of discharge-valve openings 7 that are located in a depression or well 8 near the opposite end of the tank.

Since our present invention resides in the construction and arrangement of the non-conducting barrier members 3, only a brief description of the remainder of the tank construction will be necessary for a complete understanding of our invention.

Liquid is admitted to the inlet weir 6 through a suitable pipe 9, from the continuous-flow pumping system (not shown) that is preferably associated with the liquid-rheostat tank, and flows toward the discharge-valve openings 7 substantially parallel to the electrodes 2 and the barrier members 3. The height of the electrolyte in the tank is fixed by the actuation of suitable tubular valve members (not shown), of a general type that is familiar in the art, within the tank bottom openings 7. Normally, the flow of liquid over the inlet weir 6 toward the discharge openings 7 is of relatively shallow depth and remains a material distance below the lower edges of the electrodes 2. For further description, reference may be had to a copending application of A. J. Hall, Serial No. 101,960, filed June 6, 1916.

The non-conducting barrier members 3 are arranged in staggered or non-alined pairs comprising a longer and a shorter main body member or slab 10 and 13, respectively, the pairs being assembled between the successive electrodes of greatest length, in the manner clearly shown in Fig. 3. The slabs 10 and 13 are preferably of soapstone or some other suitable non-conducing material and are supported on each side by means of plates of smaller size 11 and 14, respectively, of some suitable elastic or cushioning material, such as micarta board, or other compressed impregnated fibrous material. The side plates 11 and 14 of such resilient non-brittle material not only serve to relieve the soapstone barrier members from shock and jar, but would also tend to hold the parts of the readily breakable soapstone members together in case of breakage thereof.

It has been found that, if the upper inclined surfaces of the soapstone barriers 10 and 13 were left in the form of flat faces, "pin-arcing" would occur thereon by reason of the formation of drops or globules of the electrolyte upon such flat faces and the consequent conversion to steam, by reason of the high current density, when the electrolyte splashed over the tops of the barrier members, thereby tending to disintegrate them. To materially reduce such "pin-arcing", inserts 12 of quartz, or some other vitreous material of a relatively small co-efficient of cubical expansion and having a beveled or sharpened upper edge, as best shown in Fig. 4, are provided. The inserts 12 are cemented into grooves that run along the middle of the upper inclined surfaces of the soapstone barriers 10 and 13, respectively, and such construction will be found to decrease the above-mentioned "pin-arcing" and the resultant difficulties, since the vitreous material is inherently better able to withstand the local heating from such arcing as occurs.

The adjacent vertical edges of the soapstone slabs 10 and 13, included in each pair of barrier members, are tapered, or beveled in opposite directions, as shown at 16 and 17, respectively, in Fig. 1, to provide a suitably constricted but approximately parallel-sided path between successive longest electrodes 2, and also to prevent the occurrence of stagnant pools, or eddying, near the barrier edges, with consequent liability to the formation of steam pockets and arcing therethrough. The upper edges of the slabs 10 and 13 are sloped to correspond to the tapered lower edges of the electrodes 2 (see Fig. 2), whereby a substantially constant area of available electrolyte above the barrier members obtains, within predetermined side-tipping limits of the locomotive upon which the rheostats are installed, which is an advantageous feature.

Along the sides of the tank 1, relatively thick soapstone slabs 18 and 19 are located, and a similar slab 20 is positioned in the center of the tank. In the present instance, the sets of plates on the respective sides of the intermediate slab 20 correspond to different electrical circuits and it will, therefore, be understood that, in case a single electrical circuit is to be governed by a liquid rheostat of our invention, such an intermediate slab would not be necessary.

The soapstone blocks 4 are assembled in alinement between the successive barrier members 13 near the discharge end of the tank and severally have top surfaces 21 that slope toward the bottom openings 7. The other base-blocks 5 are rectangular in form, are alined between the other barrier members 10 and extend from the corresponding base-blocks 4 to the inlet weir 6, whereby a continuous floor for the flow of electrolyte is formed. A strip of metal 22, welded or otherwise attached to the inner wall of the well 8, is provided for further longitudinally positioning the base-blocks.

For the purpose of providing a relatively rigid and stable unitary barrier structure, discontinuous holes 25 are drilled in opposite sides of the blocks 4 and 5, and metal dowels or pin members 26 extend through each of the barrier members 10 and 13 and a certain distance into the alined holes 25 of the adjacent pairs of blocks 5 and 4, respectively. For the sake of clearness and simplicity, not all of the holes 25 are shown. Thus, the barrier structure is assembled piece by piece, including the intermediate slab 20, and finally, the side slabs 18 and 19 are secured to the tank side walls in a manner to be described, whereby the desired characteristics of rigidity and stability are secured. By providing discontinuous metal pins instead of continuous rods, undesirable expansion, by heating during rheostat operation, is obviated.

For the purpose of positioning the barrier structure as a whole within the tank 1 in order to provide the proper spaced relation with respect to the electrodes 2, suitable adjusting means 27 is provided at a plurality of points along the respective lower corners of the rheostat tank 1, that is, just below the side slabs 18 and 19. Each adjusting means comprises a short metallic plate 28 that is secured by welding, or otherwise, to the tank side wall and a corresponding metal plate 29 that is located in contact with the end of one of the stone blocks 4 and 5. By means of a suitable bolt 30 that abuts against the plate 28 and extends through the plate 29 into the adjacent base-block, and a lock nut 31 acting in conjunction with the bolt 30, the entire barrier structure or group may be shifted within predetermined limits, as will be understood.

To position the upper ends of the side slabs 18 and 19, angular brackets 32 are secured to adjacent portions of the tank side walls and bolts and lock nuts 33 and 34, respectively, are again utilized to suitably bear upon the upper faces of the slabs and rigidly secure them in position, such upper faces being protected by suitable metal pads 35.

For a description of the electrode structure and arrangement, reference may be had to a copending application of A. J. Hall, Serial No. 138,004, filed December 20, 1916.

Before discussing the operation of the liquid rheostat with respect to the non-conducting barrier members, a discussion of the development of the barrier idea that is embodied in this application, will be of value. When a pair of electrodes are immersed in an electrolyte and gradually separated, the resultant resistance or voltage drop between the plates, dependent upon the size thereof and the density of the electrolyte solution, varies approximately in proportion to the separation of the plates up to a critical distance, for instance, from 6 to 8 inches in the case of electrodes one inch square, as indicated by the points A and B of the curve chart (Fig. 5), and subsequent increased separation of the electrodes has very little effect upon the effective resistance of the liquid between the plates, as represented by the relatively flat right-hand portion of the curve. Consequently, prior-art rheostats have been limited in their application to operations not higher than 500 or 600 volts in order to keep the current density and, therefore, the arcing, evaporation of liquid and disintegration of the plates, within reasonable limits. With the present construction, however, the operating voltage of a rheostat may be raised to a very high value without any undesirable results.

Upon experimentation, it was found that, by employing a pair of relatively narrow electrodes and placing a pair of transversely-extending non-conducting barriers adjacent to the opposite plate edges, the effective operating voltage of the rheostat could be increased to a certain extent. Presumably, therefore, the electric-current paths in the electrolyte extend in lines that correspond to the lines of force emanating from magnetic poles. By restricting the available electrolyte cross-section between plates, such paths are apparently bunched, the current density is increased and, consequently, the voltage drops between the plates are accordingly augmented. However, in this and some of the following experiments, the current density at the plate surface was unduly high and further developments were necessary.

Accordingly, a pair of plates 4 were disposed in the two spaces between three insulating barriers 39, 40 and 41 (Fig. 6), the plates being relatively short, compared to the barriers, and extending in parallel relation thereto. Consequently, the current paths were formed from each electrode edge around the corresponding end of the intervening barrier to the corresponding edge of the other electrode. Here again, the straight line portion of the resistance-distance curve (Fig. 5) may be extended a certain amount, but the current density at the electrode edges is too high.

The next experiment comprised the use of one or more apertures 42 in the barriers 40 between the pair of electrodes 4, and fins or baffle-plates 43 were attached to the intermediate barrier beside the opening or openings to effect a more thorough circulation of electrolyte. The results obtained showed that this experiment was in the right direction. Accordingly, the intermediate barrier 40 was cut into two parts 44 and 45 (Fig. 7), the edges sharpened and the two parts disposed in alinement, with an opening 46 between them, while a relatively short auxiliary barrier 47, having sharpened edges, was placed opposite the opening 46 between the parts 44 and 45 and in parallel relation to the barriers and plates. A still more satisfactory result was thus obtained.

The next test arranged the barriers in substantially the order that is shown in Fig. 1, namely, a staggered relation of the two parts of each longitudinally-extending barrier, the vertical edges of which are correspondingly tapered to form a parallel-sided passage between the two barrier parts. The electric current-carrying particles thus follow a tortuous path from plate to plate, resulting in the possibility of employing the above-mentioned high voltages upon the rheostat.

It has been found that, initally, the current-carrying particles follow the path of least resistance from one plate to the next, namely, a path that extends substantially parallel to the tapered vertical edges 16 and 17 of the barrier members 10 and 13. As each current-carrying particle strikes the plate surface, a globule of steam is formed and the other particles gradually spread out over a considerable area of the plate, thus producing a fringing effect in the electrolyte. Since one side of each plate, near one end thereof, is located in such manner as to be actively included in one path of the current, while the other face of each plate, near the other end thereof, is similarly employed in connection with another pair of staggered barrier members, it follows that substantially the entire body of the electrolyte and the entire electrode material are used to the best possible advantage, and unduly high current densities in the electrolyte or at the surfaces of the plates are prevented.

However, the use of the barriers is necessary only during the initial active, or starting, operation of the rheostat, since, as the electrolyte rises to certain heights, more and more plate area is immersed, as will be clear from Fig. 3, and the undesirable current densities that would otherwise occur at the surfaces of plates unprotected by barriers of our invention, if relatively high-voltage operation were attempted, do not obtain in the higher levels of the electrolyte, because of the ample plate surface corresponding to the several phases of the electrical circuit to be governed.

Reference may now be had to Fig. 8 and Fig. 9 wherein the structure shown comprises the containing tank 1; a plurality of the electrodes 2; a group of non-conducting barrier members of soapstone slabs 50 and 51, preferably arranged in pairs in the previously-described staggered relation; a plurality of the side-plates or cushioning members 11 and 13 of micarta board or other suitable material; a number of the base-blocks 4 and 5; and resilient means 52 in the form of a plurality of spaced multi-leaf flat spring members which are secured, at their upper ends, to the adjacent tank wall, while the free lower ends thereof bear against the sides of the barrier group.

The above-mentioned soapstone slabs, micarta-boards and base-blocks are preferably assembled in the previously-described manner within the tank 1. However, in the present instance, the top edges of the soapstone slabs 50 and 51 are beveled in opposite directions to thus reduce the liability to "pin-arcing," to a certain extent, without necessitating the hereinbefore-described inserts 12 of the vitreous material. To prevent the occurrence of leakage currents from one electrode through the joints between the base-blocks and the barriers to the metal bottom of the tank and thence to another electrode, such metal bottom may be covered with a mat 53 of micarta board, or the like, upon which the barrier group rests.

The resilient means 52 is shown as comprising a plurality of three-leaf, flat-spring members that are suitably spaced apart along each side of the barrier group and severally operate within guiding channels that are formed by angle-irons 54 arranged in pairs, and which are riveted or otherwise suitably secured to a metallic bar member 55 that extends along the edge of the outer soapstone base-block. For the purpose of rigidly securing the upper ends of the spring members a plurality of Z-bars 56 have their respective flanges riveted to the tank wall and bolted to the upper ends of the spring members, the lower ends of which are thus adapted to freely bear against the sides of the barrier group. Intermediately located Z-bars 57 are also preferably employed to partially support the spring members by bearing against them near their middle portions and thus forming a fulcrum point.

The barrier group is thus resiliently positioned in the containing tank, and shocks and jars imparted to the group are absorbed by the various spring members so that the possibility of breakage of the barrier-group slabs is very remote. Such an arrangement is particularly valuable in cases where the slabs in question extend cross-wise of a locomotive, whereby starting and stopping thereof tends to shear off the slabs, as will be understood.

A modified construction for resiliently securing the barrier group within the rheostat tank is shown in Fig. 10 and Fig. 11 and comprises a plurality of the three-leaf spring members 52 that are spaced along each side of the group in the previously-described manner.

However, instead of employing the angle-iron guiding channels that are illustrated in Fig. 9, the lower ends of the spring members are riveted directly to the bar 55 that extends along the edge of the outer soapstone block. In the place of the two Z-bars 56 and 57 that are shown in Fig. 8, a single channel member 60, having an intermediate flat portion 61 and off-set side flanges 62 and 63, is utilized to rigidly secure the upper end of each spring member to the adjacent tank wall, and also to provide a suitable intermediate fulcrum-point on the spring member.

The intermediate portion 61 of each channel member 60 is secured by rivets 64, or otherwise, to the adjacent tank wall, while the upper flange 62 is attached, by means of a bolt 65, for example, to the upper end of the corresponding spring member. The lower flange 63 merely bears against the middle portion of the spring member, thereby acting as a fulcrum-point to cause a desirable pressure to be exerted against the barrier group, as a whole.

For the sake of saving weight and cost, the channel members 60 are shown as having a width that is substantially equal to that of the flat-spring members, although, if desired, a single channel member that extends the entire width of the tank may be employed.

In view of the general similarity of the structure just described to that set forth in connection with Fig. 8 and Fig. 9, it is believed that the operation of spring members 52 to suitably reduce shocks and jars to the barrier group will be fully understood without further description.

We do not wish to be restricted to the specific structural details or arrangement of parts herein set forth, as various modifications thereof may be effected without departing from the spirit and scope of our invention. We desire, therefore, that only such limitations shall be imposed as are indicated in the appended claims.

We claim as our invention:

1. In a liquid rheostat, the combination 1. with a tank and a plurality of electrodes contained therein, of a plurality of barrier members of non-conducting material extending upwardly from the tank bottom to a predetermined height above the lower edges of said electrodes.

2. In a liquid rheostat, the combination with a tank and a plurality of electrodes contained therein, of means extending upwardly from the tank bottom for causing the current-carrying particles of electrolyte to follow a tortuous path, whereby the voltage between electrodes is materially increased.

3. In a liquid rheostat, the combination with a tank and a plurality of electrodes contained therein, of a plurality of non-conducting barriers assembled in staggered pairs between successive electrodes.

4. In a liquid rheostat, the combination with a tank and a plurality of electrodes contained therein, of a plurality of non-conducting barriers extending upwardly from the tank bottom for a predetermined distance and assembled in staggered pairs between successive electrodes.

5. In a liquid rheostat, the combination with a tank and a plurality of electrodes contained therein, of a plurality of non-conducting barriers extending upwardly from the tank bottom to a predetermined height above the lower edges of said electrodes and assembled in staggered pairs between successive electrodes.

6. In a liquid rheostat, the combination with a tank and a plurality of electrodes contained therein, of a plurality of non-conducting barriers assembled in staggered pairs between successive electrodes, the adjacent vertical edges of the barriers being beveled.

7. In a liquid rheostat, the combination with a tank and a plurality of electrodes having tapered edges, of a plurality of barrier members of non-conducting material extending upwardly from the tank bottom and having upper edges that correspond in inclination to said tapered electrode edges.

8. In a liquid rheostat, the combination with a tank and a plurality of electrodes having tapered edges, of a plurality of non-conducting barrier members extending upwardly from the tank bottom to a predetermined height above said tapered electrode edges, the upper edges of said barrier members having a corresponding inverted taper.

9. In a liquid rheostat, the combination with a tank and a plurality of electrodes having tapered edges, of a plurality of non-conducting barriers assembled in staggered pairs between successive electrodes, the adjacent vertical edges of the barriers being beveled, and the upper edges of the allied barriers being inclined to correspond to said tapered electrode edges.

10. A non-conducting barrier member for liquid rheostats having, on its upper edge, means for preventing "pin-arcing" by reason of the formation of drops of liquid thereon.

11. A non-conducting barrier member for liquid rheostats having, in its upper edge, an inserted member of a material having a relatively low co-efficient of cubical expansion.

12. A non-conducting barrier member for liquid rheostats having, on its upper edge, an inserted member of vitreous material having a beveled upper edge.

13. In a liquid rheostat, the combination with a non-conducting barrier member of readily breakable material, of means disposed along the sides thereof to provide a supporting and cushioning effect.

14. In a liquid rheostat, the combination with a non-conducting barrier member of readily breakable material, of a plurality of plates of resilient, non-brittle material of smaller size than the barrier member placed on opposite sides thereof.

15. A non-conducting barrier group for liquid rheostats comprising a plurality of upwardly-extending slabs, cushioning plate members on each side thereof, and a plurality of base-blocks rigidly positioned between successive slabs.

16. A non-conducting barrier group for liquid rheostats comprising a plurality of upwardly-extending slabs arranged in staggered pairs, cushioning plate members of smaller size than the corresponding slabs located on each side thereof, and a plurality of spacing base-blocks rigidly positioned between successive slabs.

17. A non-conducting barrier group for liquid rheostats comprising a plurality of upwardly-extending slabs arranged in staggered pairs, cushioning plate members of smaller size than the corresponding slabs located on each side thereof, a plurality of spacing base-blocks rigidly positioned between successive slabs, and a plurality of inserts of vitreous material located along the upper edges of said slabs.

18. In a liquid rheostat, the combination with an electrode-containing tank, of a non-conducting barrier group comprising a plurality of slabs extending upwardly between the electrodes and arranged in staggered pairs, cushioning plate members of smaller size than the corresponding slabs located on each side thereof, a plurality of base-blocks rigidly positioned between successive slabs, and means for adjustably positioning the group in said tank.

19. In a liquid rheostat, the combination with a tank and plurality of electrodes contained therein, of a plurality of barrier members of non-conducting material extending upwardly from the tank bottom, and means for resiliently associating the barrier members with certain of the tank walls to reduce shock.

20. In a liquid rheostat, the combination with a tank and a plurality of electrodes contained therein, of a plurality of non-conducting barriers assembled in staggered pairs between successive electrodes, and means for resiliently associating the barrier members with certain of the tank walls.

21. In a liquid rheostat, the combination with a tank and a plurality of electrodes contained therein, of a plurality of non-conducting barrier members extending upwardly from the tank bottom and assembled in staggered pairs between successive electrodes, the upper edges and the adjacent vertical edges of the barrier members being beveled.

22. The combination with a tank, of a non-conducting barrier group comprising a plurality of upwardly-extending slabs, cushioning plate members on each side thereof, a plurality of base-blocks positioned between successive slabs, and means for resiliently assembling the group in said tank.

23. The combination with a tank, of a non-conducting barrier group comprising a plurality of upwardly-extending slabs arranged in staggered pairs, cushioning plate members of smaller size than the corresponding slabs located on each side thereof, a plurality of spacing base-blocks rigidly positioned between successive slabs, and a plurality of flat-spring members each having one end rigidly secured to a tank wall and the other end bearing against the group.

24. In a liquid rheostat, the combination with a tank and a plurality of electrodes contained therein, of a plurality of barrier members of non-conducting material extending toward and between said electrodes to a predetermined distance beyond the nearer set of edges thereof.

25. In a liquid rheostat, the combination with a tank and a plurality of electrodes contained therein, of a plurality of barrier members of non-conducting material supported at the tank bottom and extending upwardly between said electrodes.

26. A non-conducting barrier member for liquid rheostats having, on a free edge, means comprising an anhydrous insert for preventing arcing by reason of the formation of drops of liquid upon the barrier member.

27. A liquid rheostat of the type wherein the liquid level is varied to change the rheostat resistance embodying a plurality of non-conducting barrier members that are totally immersed during the greater portion of the rheostatic operation.

28. A liquid rheostat of the type wherein the liquid level is varied to change the rheostat resistance embodying a plurality of non-conducting barrier members that are supported by the rheostat frame and are totally immersed after the initial operating stages of the rheostat.

In testimony whereof, we have hereunto subscribed our names this 29th day of November, 1916.

A. J. HALL.
CHARLES C. WHITTAKER.